United States Patent
Omori et al.

(10) Patent No.: US 8,944,688 B2
(45) Date of Patent: Feb. 3, 2015

(54) RADIAL FOIL BEARING

(71) Applicant: IHI Corporation, Tokyo (JP)

(72) Inventors: Naomichi Omori, Tokyo (JP); Tohru Tanaka, Tokyo (JP)

(73) Assignee: IHI Corporation (JP)

( * ) Notice: Subject to any disclaimer, the term of this patent is extended or adjusted under 35 U.S.C. 154(b) by 0 days.

(21) Appl. No.: 14/246,507

(22) Filed: Apr. 7, 2014

(65) Prior Publication Data

US 2014/0219590 A1 Aug. 7, 2014

Related U.S. Application Data

(63) Continuation of application No. PCT/JP2012/072478, filed on Sep. 4, 2012.

(30) Foreign Application Priority Data

Oct. 13, 2011 (JP) .................................. 2011-225905

(51) Int. Cl.
*F16C 32/06* (2006.01)
*F16C 17/02* (2006.01)

(52) U.S. Cl.
CPC .............. *F16C 17/024* (2013.01); *F16C 32/06* (2013.01)
USPC ........................................................ 384/106

(58) Field of Classification Search
USPC ................................................ 384/103–106
See application file for complete search history.

(56) References Cited

U.S. PATENT DOCUMENTS

| | | | | |
|---|---|---|---|---|
| 3,795,427 A * | 3/1974 | Licht et al. | ..................... | 384/103 |
| 4,552,466 A * | 11/1985 | Warren | ........................ | 384/103 |
| 5,658,079 A * | 8/1997 | Struziak et al. | ............... | 384/106 |
| 5,988,885 A * | 11/1999 | Heshmat | ....................... | 384/106 |
| 6,135,640 A | 10/2000 | Nadjafi | ......................... | 384/103 |
| 8,414,191 B2 * | 4/2013 | Flora et al. | .................... | 384/103 |
| 2007/0047858 A1 | 3/2007 | Hurley et al. | ................. | 384/106 |

FOREIGN PATENT DOCUMENTS

| | | |
|---|---|---|
| JP | 59-035723 | 3/1984 |
| JP | 2002-061645 | 2/2002 |
| JP | 2004-270904 | 9/2004 |
| JP | 2006-057652 | 3/2006 |
| JP | 2009-299748 | 12/2009 |
| JP | 2010-529390 | 8/2010 |
| JP | 2011-017385 | 1/2011 |
| JP | 2011-033176 | 2/2011 |

(Continued)

OTHER PUBLICATIONS

International Search Report and Written Opinion mailed Oct. 23, 2012 in corresponding PCT International Application No. PCT/JP2012/072478.

*Primary Examiner* — Thomas R Hannon
(74) *Attorney, Agent, or Firm* — Ostrolenk Faber LLP

(57) ABSTRACT

This relates to a radial foil bearing (3) that supports a rotating shaft (1). The radial foil bearing (3) is provided with a top foil (10), a back foil (11), and a bearing housing (12) that houses them. An engagement notch (15) that extends from the inner circumferential edge to the outer circumferential edge of the bearing housing (12) is formed at both sides of the bearing housing (12). An engagement protruding piece (30) that engages with each engagement notch (15) is provided at both side end portions of the back foil (11) on one side in the circumferential direction of the bearing housing (12).

3 Claims, 7 Drawing Sheets

(56) References Cited

FOREIGN PATENT DOCUMENTS

| | | |
|---|---|---|
| JP | 2011-144846 | 7/2011 |
| JP | 2012-241775 | 12/2012 |
| JP | 2013-024344 | 2/2013 |
| JP | 2013-032799 | 2/2013 |
| JP | 2013-100885 | 5/2013 |
| WO | WO 2008/153226 A1 | 12/2008 |
| WO | WO 2013/018618 A1 | 2/2013 |
| WO | WO 2013/024674 A1 | 2/2013 |

* cited by examiner

RADIAL FOIL BEARING

This application is a Continuation of International Application No. PCT/JP2012/072478, filed on Sep. 4, 2012, claiming priority based on Japanese Patent Application No. 2011-225905, filed Oct. 13, 2011, the content of which is incorporated herein by reference in their entity.

TECHNICAL FIELD

The present invention relates to a radial foil bearing.

BACKGROUND ART

Conventionally, as a bearing for a high-speed rotating body, there is known a radial bearing that is used by being fitted on a rotating shaft. As such a radial bearing, there is a well-known radial foil bearing that is provided with a thin plate-shaped top foil that forms the bearing surface, a back foil that resiliently supports this top foil, and a cylindrical bearing housing that houses the top foil and the back foil. As the back foil of the radial foil bearing, a bump foil that consists of a thin plate molded in a corrugated shape is mainly used.

In the case of this kind of radial foil bearing, in order to prevent the top foil and the back foil from dropping out of the bearing housing, one end portion thereof (toe portion) is directly fixed to the bearing housing via spot welding or indirectly fixed via a spacer.

Also, as a structure that fixes in a mechanical manner instead of fixing by the aforementioned welding, structures are also known in which end portions of the top foil and the back foil (bump foil) are bent over by a bending process, with this bent portion being made to engage with an engagement groove that is formed in the inner circumferential surface of the bearing housing (for example, refer to Patent Documents 1 to 3).

PRIOR ART DOCUMENTS

Patent Documents

[Patent Document 1] Japanese Unexamined Patent Application, First Publication No. 2011-033176
[Patent Document 2] Japanese Unexamined Patent Application, First Publication No. 2011-017385
[Patent Document 3] Japanese Unexamined Patent Application, First Publication No. 2002-061645

DISCLOSURE OF INVENTION

Problems to be Solved by the Invention

However, when fixing the back foil (bump foil) to the bearing housing by welding, the back foil and the bearing housing deform due to heat input, and strain arises in the top foil under that influence.

Also, in the structures disclosed in Patent Documents 1 to 3, by engaging the end portions (bent portions) of the top foil and the back foil (bump foil) with the engagement groove that is formed in the inner circumferential surface of the bearing housing, the top foil and the back foil are fixed to the bearing housing.

However, in the aforementioned structures, when the radial foil bearing is subjected to a large external force during operation, the back foil in particular slides in the axial direction of the bearing housing, causing rattling to occur. Thereupon, due to the rattling of this back foil, strain of the top foil can occur.

Also, the thickness of the lubricating fluid film of the foil bearing that is formed between the rotating shaft and the top foil becomes extremely thin at around 10 micrometers due to the rotation of the rotating shaft. For this reason, even a little strain in the top foil imparts an adverse effect on the load capability and the dynamic characteristics (rigidity and attenuation) of the bearing. As a result, a bearing that has the as-designed performance is no longer obtained.

Also, in order to improve the bearing performance of the radial foil bearing, dividing the back foil into a plurality in the circumferential direction is effective. However, in that case, fixed points of the back foil with respect to the bearing housing become numerous. For that reason, the number of man-hours increases due to the increase in the number of welding locations in the fixing by conventional welding, leading to an increase in the manufacturing cost. Also, when the welded locations increase in number, if all the locations that have been welded could not be welded in a satisfactory manner, the product cannot be shipped. For this reason, quality maintenance at the time of manufacture becomes difficult, and the manufacturing cost is increased due to a decline in the yield rate.

The present invention was achieved in view of the above circumstances, and has as its object to provide a radial foil bearing that minimizes the strain that occurs in the top foil, and has as-designed satisfactory performance with regard to the load capability and dynamic characteristics (rigidity and attenuation) of the bearing and so keeps down manufacturing costs.

Means for Solving the Problems

A radial foil bearing according to the first aspect of the present invention, by being fitted on a rotating shaft, supports the rotating shaft, and is provided with a cylindrical top foil that is arranged facing the rotating shaft; a back foil that is arranged on the outer side of the top foil in the radial direction; and a cylindrical bearing housing that houses the top foil and the back foil in the state of being inserted therein. An engagement notch that extends from the inner circumferential edge to the outer circumferential edge of the bearing housing is formed at both sides of the bearing housing. An engagement protruding piece that engages with each engagement notch is provided at both side end portions of the back foil on one side in the circumferential direction of the bearing housing.

In this case, the engagement notch is formed on both sides of the bearing housing, the engagement protruding piece is provided at both side end portions of one side of the back foil, and these engagement protruding pieces are made to engage with the engagement notches. For this reason, it is possible to house and fix the back foil to the bearing housing without performing spot welding on the back foil. Also, since sliding of the back foil in the circumferential direction and the axial direction of the bearing housing is restricted by the engagement notches that are formed in both sides of the bearing housing, hardly any rattling occurs. Accordingly, it is possible to prevent the occurrence of strain in the top foil due to spot welding of the back foil or rattling of the back foil. Also, since welding of the back foil is not necessary, it is possible to eliminate improper assembly due to poor welding and variations in assembly.

Also, according to a radial foil bearing of the second aspect of the present invention, the back foil in the first aspect mentioned above is constituted having a plurality of back foil pieces that are arranged along the circumferential direction of the bearing housing. It is preferred that the engagement protruding piece be formed on each of the back foil pieces.

The back foil resiliently supports the top foil. For this reason, the back foil, upon receiving a load from the top foil, deforms in the circumferential direction, and thereby permits flexure of the top foil and supports the top foil. However, when the back foil deforms in the circumferential direction, since it is affected by friction with the bearing housing, it easily deforms at the free end side, but is hindered from deforming at the fixed end side where the engagement protruding pieces are formed. For this reason, a difference arises in the support rigidity between the free end side and the fixed end side of the back foil, and so uniform support rigidity is not obtained in the bearing as a whole.

Therefore, the back foil is constituted in a configuration having a plurality of back foil pieces that are arranged along the circumferential direction of the bearing housing. For that reason, the distance between the fixed end and the free end of the back foil piece is shorter, and so the difference in support rigidity between the free end side and the fixed end side is smaller. As a result, the variation in support rigidity of the back foil as a whole is smaller.

Also, according to a radial foil bearing of the third aspect of the present invention, it is preferred that a mutually adjacent pair of back foil pieces among the back foil pieces in the second aspect mentioned above be arranged in a state of their respective engagement protruding pieces being contiguous. In addition, it is preferred that the contiguous pair of engagement protruding pieces be engaged in one engagement notch.

In this case, it is possible to reduce the number of engagement notches to be formed in the bearing housing. That is to say, by reducing the number of locations of the bearing to be machined, it is possible to hold down the machining cost.

In addition, according to a radial foil bearing of the fourth aspect of the present invention, in any one of the first to third aspects mentioned above it is preferred that an engagement groove with a depth that is shallower than the engagement notch be formed in the inner circumferential surface of the bearing housing, between the opposing pair of engagement notches. Also, it is preferred that an engagement protrusion with a height that is lower than the engagement protruding piece be formed on the back foil between the engagement protruding pieces, and that the engagement protrusion engage in the engagement groove, in addition to the engagement protruding piece engaging in the engagement notch.

In this case, due to the engagement protrusion being engaged in the engagement groove, the back foil is more firmly fixed to the bearing housing.

Effects of the Invention

According to the radial foil bearing of the present invention, the occurrence of strain in the top foil due to spot welding of the back foil and rattling of the back foil is prevented, and strain of the top foil is lessened. As a result, it is possible to obtain a radial foil bearing having as-designed good performance with regard to the load capability and the dynamic characteristics (rigidity and attenuation) of the bearing.

Since improper assembly due to poor welding and variations in assembly are eliminated by welding not being required, it is possible to lower the manufacturing cost due to the improvement in the yield rate during manufacture.

EMBODIMENTS FOR CARRYING OUT THE INVENTION

Figure 1:
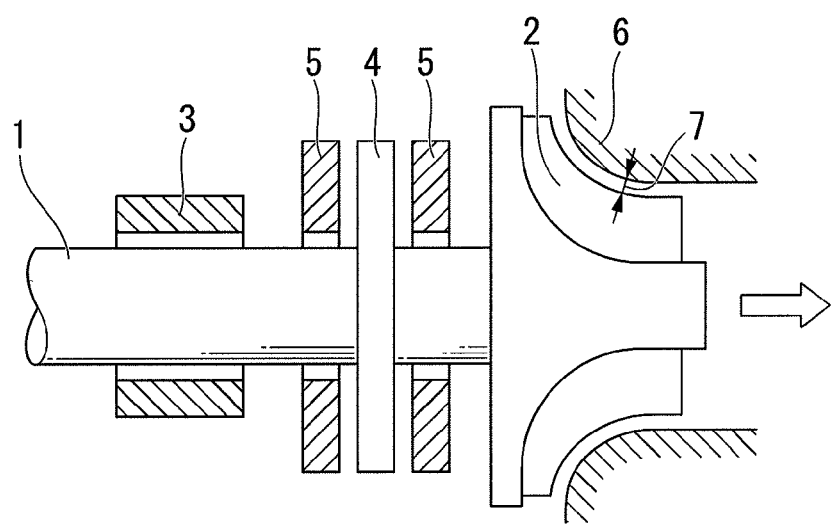
FIG. 1 is a schematic view that shows one example of a turbomachine in which the radial foil bearing according to the present invention is applied.

Hereinbelow, the radial foil bearing of the present embodiment shall be described in detail referring to the drawings. Note that in the drawings given below, the scale of each member is suitably altered in order to make each member a recognizable size.

[First Embodiment]

FIG. 1 is a side view that shows an example of a turbomachine in which the radial foil bearing according to the present invention is applied. FIG. 1 shows a rotating shaft 1, an impeller 2 that is provided at the distal end portion of the rotating shaft 1, a radial foil bearing 3, a thrust collar 4, a thrust bearing 5, and a housing 6. Note that FIG. 1 only shows one radial foil bearing for abbreviation, but normally two radial foil bearings are provided in the shaft direction of the rotating shaft 1, whereby the support structure of the rotating shaft 1 is constituted. Accordingly, in the present embodiment, two radial foil bearings 3 are provided.

The thrust collar 4 is fixed to the side of the rotating shaft 1 at which the impeller 2 is formed. The thrust bearing 5 is arranged on both sides of the thrust collar 4 so as to face the thrust collar 4.

Also, the impeller 2 is arranged in the housing 6 that serves as the static side, and has a tip clearance 7 with the housing 6. Also, a radial foil bearing 3 is fitted on the rotating shaft 1 more to the middle side of the rotating shaft 1 than the thrust collar 4.

Figure 2A:
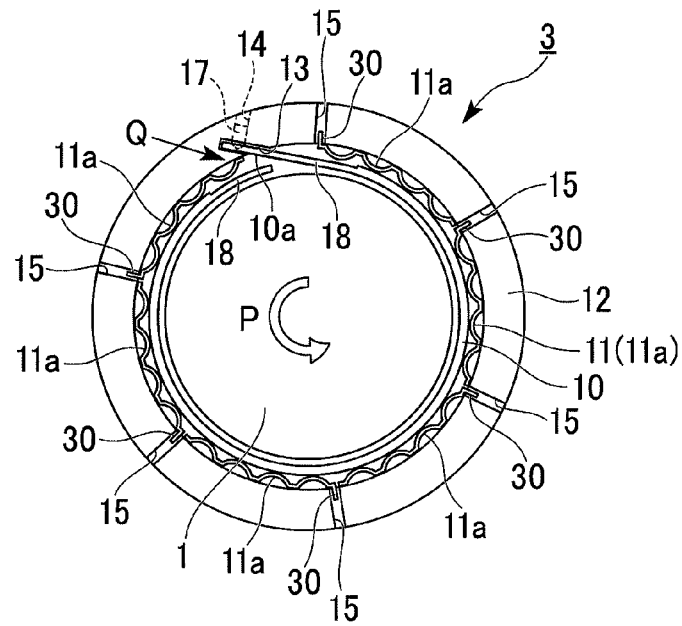
FIG. 2A is a side view of the radial foil bearing that shows an outline constitution of the first embodiment of the radial foil bearing according to the present invention.

FIG. 2A to FIG. 2D are drawings that show the first embodiment of the radial foil bearing that is applied to a turbomachine with the aforementioned constitution. As shown in FIG. 2A, the radial foil bearing 3 of the present embodiment is fitted on the rotating shaft 1 to support the rotating shaft 1, and has a cylindrical shape. The radial foil bearing 3 is provided with a cylindrical top foil 10 that is arranged facing the rotating shaft 1, a back foil 11 that is arranged on the radial-direction outer side of the top foil 10, and a bearing housing 12 that is arranged on the radial-direction outer side of the back foil 11.

The bearing housing 12 constitutes the outermost portion of the radial foil bearing 3, consists of metal, and has a cylindrical shape. The bearing housing 12 houses in its interior the back foil 11 and the top foil 10. A groove 13 along the axial direction of the bearing housing 12 is formed on the inner circumferential surface of the bearing housing 12.

That is to say, the groove 13 is formed in the inner circumferential surface of the bearing housing 12 along the entire length of the bearing housing 12 in the axial direction. The groove 13 is formed so that the depth direction thereof matches the direction of extension of one side 10a of the top foil 10 described below. Also, the depth of the groove 13 is around 2 mm to 5 mm.

Also, a pair of holes 14 that communicate with the groove 13 is formed in the outer circumferential side of the bearing housing 12. These holes 14 are used for fixing in the groove 13 the one side 10a of the top foil 10 that is inserted into the groove 13 as described below. That is to say, the holes 14 are holes for insertion of male screws, and female screw portions are formed on the inner circumferential surface thereof.

Figure 2B:
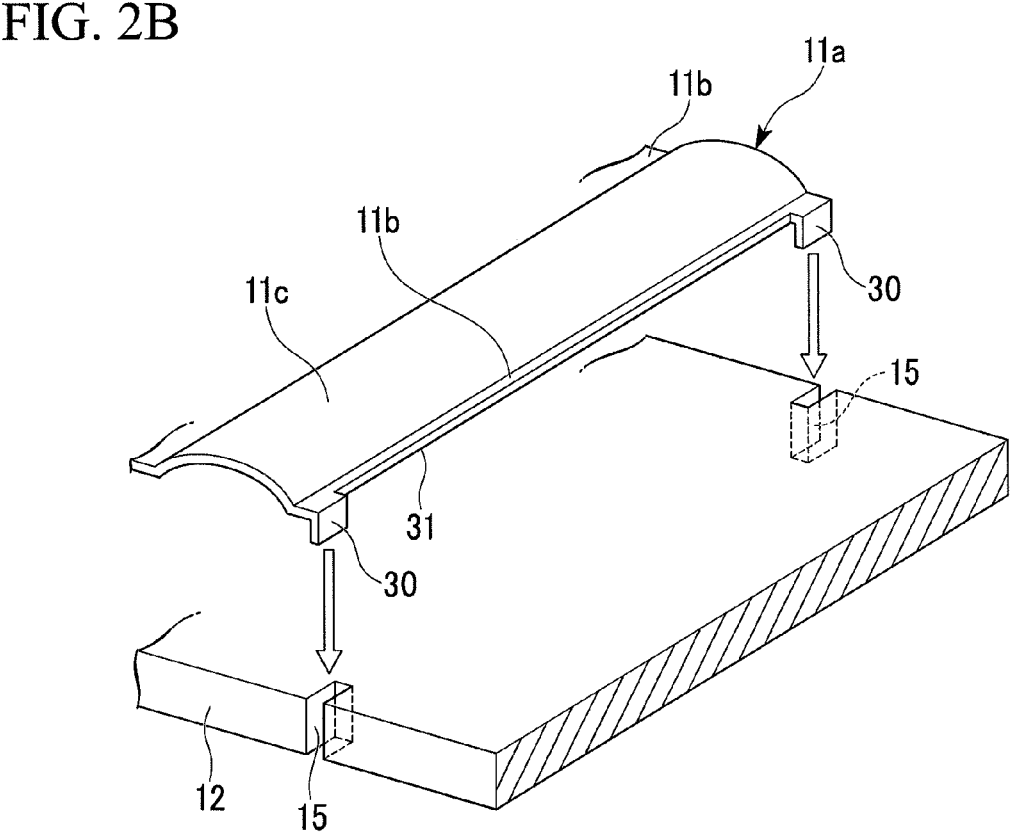
FIG. 2B is a perspective view that shows the essential portions of the radial foil bearing, showing an outline constitution of the first embodiment of the radial foil bearing according to the present invention.

Also, six (a plurality of) engagement notches 15 that extend from the inner circumferential edge toward the outer circumferential edge of the bearing housing 12 are formed on both side surfaces of the bearing housing 12 as shown in FIG. 2A and FIG. 2B. The engagement notch 15 of the present embodiment has a groove shape that is cut out from the inner circumferential edge toward the outer circumferential edge of the bearing housing 12. As shown in FIG. 2A, the engagement notches 15 are respectively formed at positions that divide into six portions the side surface of the bearing housing 12 in the circumferential direction thereof. Engagement protruding pieces 30 of the back foil 11 described below engage with these engagement notches 15. Note that in the present embodiment, the groove 13 is arranged between two of the engagement notches 15 among the six engagement notches 15.

The back foil 11 is formed by a foil (thin plate) and resiliently supports the top foil 10. As the back foil 11, for example a bump foil, the spring foil disclosed in Japanese Unexamined Patent Application, First Publication No. 2006-57652 and Japanese Unexamined Patent Application, First Publication No. 2004-270904, or the back foil disclosed in Japanese Unexamined Patent Application, First Publication No. 2009-299748 is used. In the present embodiment, a bump foil is used as the back foil 11. However, the aforementioned spring foil or back foil may also be used as the back foil.

As shown in FIG. 2A, the back foil (bump foil) 11 is constituted by six (a plurality of) back foil pieces 11a that are arranged along the circumferential direction of the top foil 10. In each back foil piece 11a, the foil (thin plate) thereof is molded in a corrugated shape, and the side surface thereof is molded so as to be an approximate circular arc on the whole. The six back foil pieces 11a are all formed with the same shape and dimensions. Accordingly, these back foil pieces 11a are arranged so as to divide the inner circumferential surface of the bearing housing 12 into approximately six parts.

Also, these back foil pieces 11a are arranged with a gap of a certain amount created at the position where they sandwich the groove 13, while at positions other than that, they are arranged with their mutual end portions in close proximity. With the aforementioned constitution, the six back foil pieces 11a are arranged along the inner circumferential surface of the bearing housing 12 so as to become an approximately cylindrical shape as a whole.

Figure 2C:
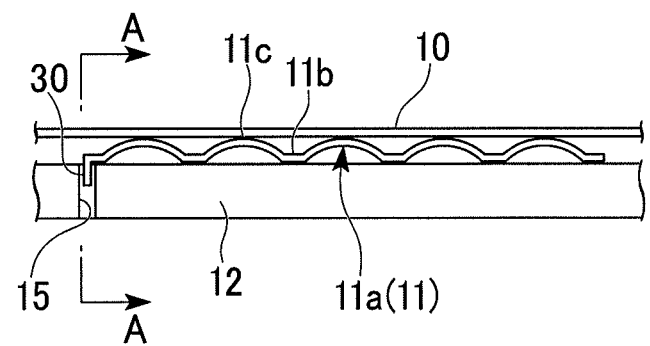
FIG. 2C is a side view that schematically shows a flattened version of the essential portions of FIG. 2A, showing an outline constitution of the first embodiment of the radial foil bearing according to the present invention.

Also, in the back foil piece 11a that is molded in a corrugated shape, as shown in FIG. 2C that schematically shows the essential portions of FIG. 2A flattened out, a flat valley portion 11b that makes contact with the bearing housing 12, and a curved mountain portion 11c that makes contact with the top foil 10 are alternately formed along the circumferential direction of the bearing housing 12. The back foil pieces 11a in particular resiliently support the top foil 10 by the mountain portions 11c that make contact with the top foil 10. Also, a fluid passage is formed by the mountain portion 11c and the valley portion 11b in the axial direction of the radial foil bearing 3.

Figure 3A:
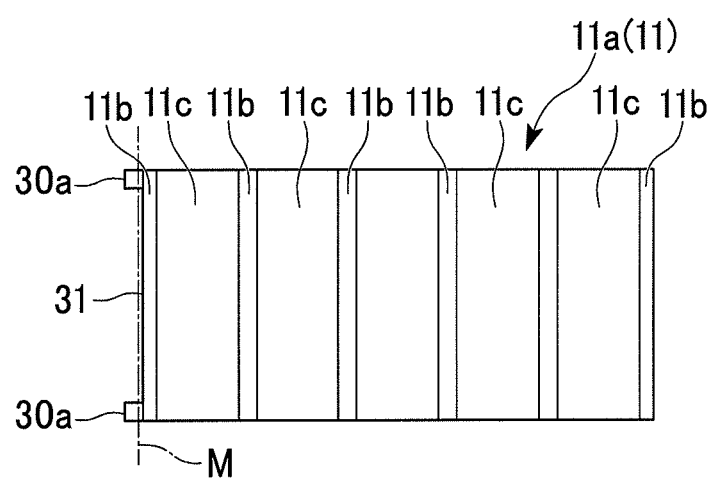
FIG. 3A is a plan view of the flattened back foil piece.
Figure 3B:
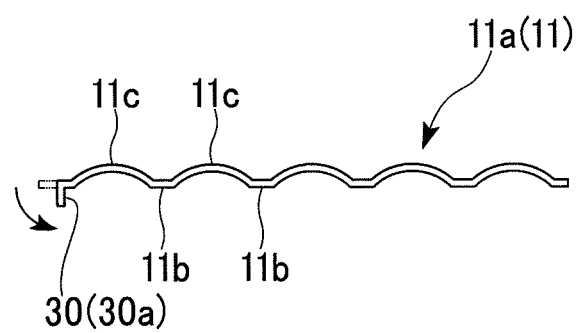
FIG. 3B is a side view of the flattened back foil piece.

At both side end portions of one side of these back foil pieces 11a (that is to say, the one side in the circumferential direction of the bearing housing 12), the engagement protruding pieces 30 are formed. As shown in FIG. 3A that is a plan view of the back foil pieces 11a that have been flattened out, a concave portion 31 is formed in the engagement protruding pieces 30, 30 by the space between the both side end portions 30a, 30a of the one side that becomes the valley portion 11b being cut away. Also, these engagement protruding pieces 30, 30 are formed by the both side end portions 30a, 30a being bent downward at an approximate right angle (the direction opposite to the direction in which the mountain portion 11c protrudes), as shown in FIG. 3B which is the side view of the flattened back foil piece 11a. Note that the bending positions of the both side end portions 30a, 30a are shown by the bending line M in FIG. 3A.

As a result of the bending process of the engagement protruding pieces 30, 30 (both side end portions 30a, 30a), strain occurs in the back foil piece 11a (back foil 11). However, since the portion that has been processed is small, the strain that is produced is small, and so that strain has no effect on the top foil 10.

Note it is preferred to form the concave portion 31 in the back foil piece 11a using etching or discharge machining so that burrs are not generated and without imparting stress, as well as not producing strain. That is to say, after forming the concave portion 31 in the foil using etching or discharge machining, press molding is performed for forming the mountain portions 11c and the valley portions 11b. Thereafter, it is preferred to form the engagement protruding pieces 30, 30 by bending the both side end portions 30a, 30a, and form the back foil piece 11a.

Figure 2D:
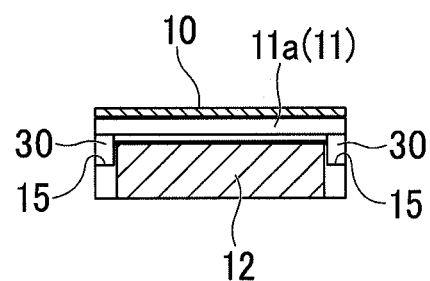
FIG. 2D is a cross-sectional view taken along the A-A arrows of FIG. 2C, showing an outline constitution of the first embodiment of the radial foil bearing according to the present invention.

These engagement protruding pieces 30, 30 respectively engage with the engagement notches 15 as shown in FIG. 2A. That is to say, as shown by the arrows in FIG. 2B, the engagement protruding pieces 30, 30 of the back foil piece 11a are inserted into the engagement notches 15 of the bearing housing 12. Thereby, as shown in FIG. 2D that is a cross-sectional view taken along the A-A arrows of FIG. 2C, the engagement protruding pieces 30 are engaged in the engagement notches 15, 15. When the engagement protruding pieces 30, 30 are engaged in the engagement notches 15, 15, sliding of the back foil pieces 11a in the circumferential direction of the bearing housing 12 is restricted. Also, sliding of the back foil pieces 11a in the axial direction is also restricted by the engagement notches 15, 15 in which the engagement protruding pieces 30, 30 are engaged. For this reason, rattling of the back foil piece 11a (back foil 11) hardly occurs.

Note that the length of the engagement protruding piece 30 is a length that does not project to the outer circumferential surface side of the bearing housing 12. Specifically, in the case of the thickness of the bearing housing 12 being for example 5 mm, the length of the engagement protruding piece 30 is around 2 mm to 5 mm.

As shown in FIG. 2A, the top foil 10 is constituted so as to be wrapped in a cylindrical shape along the inner surface of the back foil 11 that consists of the six back foil pieces 11a. In addition, the top foil 10 is arranged so that the distal end of the one side 10a engaged with the groove 13 that is formed in the bearing housing 12. The top foil 10 is formed by a rectangular metallic foil, of which the bearing circumferential direction is the long side and the bearing length direction is the short side, that is wound in a cylindrical shape in the lengthwise direction (bearing circumferential direction) of the long side.

The top foil 10 is not wound so that both ends of the metallic foil are butt joined, but rather wound so that the one side 10a overlaps the outer side of the other side. Also, the one side 10a is formed so as to extend out in the tangential direction at a predetermined position of the cylinder that is formed by the portions other than that.

Also, the depth direction of the groove 13 in the bearing housing 12 is formed so as to match the extension direction of the one side 10a of the top foil 10.

Accordingly, the top foil 10 is arranged so that the direction in which the one side 10a extends out matches the depth direction of the groove 13, whereby the distal end portion of the one side 10a is engaged in the groove 13. Thereby, the top foil 10 does not deform in the state of the one side 10a being engaged in the groove 13. For that reason, strain is not produced in the top foil 10.

Also, in the present embodiment, the one side 10a of the top foil 10 that is engaged in the groove 13 is fixed in the groove 13 by male screws 17. That is to say, due to the male screws 17 being threadably inserted in the holes 14, the one side 10a is brought into close contact with the interior wall surfaces of the groove 13 and thereby fixed. Note that the deformation of the one side 10a due to the close contact with the interior wall surfaces of the groove 13 is slight. Accordingly, no strain occurs in the top foil 10 from this deformation.

Also, at the one side 10a of the top foil 10 and the other side that is opposite to that, a thin-walled portion 18 that is thin compared to the center portion therebetween is formed. These thin-walled portions 18 are formed by the outer circumferential surface thereof (the surface on the back foil 11 side) being reduced in thickness so as to assume a concave state compared to the outer circumferential surface of the middle portion of the top foil 10.

The thin-walled portions 18 are formed to a desired thickness (thinness) by controlling in units of tens of micrometers both end portions of the top foil 10 by, for example, etching. Specifically, in the case of the bearing diameter being φ35 mm, assuming the thickness of the top foil 10 is 100 micrometers, the thickness of the thin-walled portions 18 is formed to be around 80 micrometers. Note that due to the aforementioned etching, the stress that is produced in the top foil 10 compared to bending is extremely small. Accordingly, there is hardly any strain produced in the top foil 10 from this processing.

Also, the length of the thin-walled portion 18 in the circumferential direction is for example a length that corresponds to the groove 13 and up to one mountain portion of the end portion of the back foil 11 (back foil piece 11a) positioned on both sides of the groove 13.

By forming the thin-walled portion 18 at both end portions of the top foil 10, these both end portions (thin-walled portions 18) readily undergo elastic deformation. Accordingly, these both end portions (thin-walled portions 18) become curved surfaces following the curved surface that constitutes the inner circumferential surface of the bearing housing 12. Thereby, at both end portions of the top foil 10, hardly any force that constricts the rotating shaft 1 (local preload) is produced.

That is to say, in the case of having fixed one end portion (toe portion) of the top foil to the bearing housing by spot welding in the conventional manner, the vicinity of both ends (the toe end side and free end side) enters a plane-like state that is hindered from adapting to the curved surface that constitutes the inner circumferential surface of the bearing housing. Thereby, a force that constricts the rotating shaft 1 (local preload) is produced at a section close to the plane. As a result, problems arise such as the starting torque increasing, and the heat generation during operation becoming higher than the setting. In contrast, by forming the thin-walled portion 18 at both end portions of the top foil 10 of the present embodiment, hardly any force that constricts the rotating shaft 1 (local preload) is produced as described above.

In addition, the thin-walled portions 18 are formed by reducing the thickness of the outer circumferential surface of the top foil 10 at both ends so as to assume a concave state compared to the outer circumferential surface of the middle portion. For that reason, a gap is formed between the thin-walled portions 18 and the back foil 11 that supports the outer circumferential surface side thereof, and between the thin-walled portions 18 and one mountain portion of the end portion thereof. Thereby, at the thin-walled portions 18, it is possible to reliably prevent the generation of a force that constricts the rotating shaft 1 (local preload).

Next, the action of the radial foil bearing 3 that consists of the aforementioned constitution shall be described.

In the state of the rotating shaft 1 being stopped, the top foil 10 is in close contact with the rotating shaft 1 by being biased to the rotating shaft 1 by the back foil 11 (the six back foil pieces 11a).

Note that in the present embodiment, both ends portions of the top foil 10 are the thin-walled portions 18. For that reason, a force that constricts the rotating shaft 1 (local preload) is hardly produced at these thin-walled portions 18.

As shown by the arrow P in FIG. 2A, when rotation of the rotating shaft 1 is started in the direction of the arrow P, rotation begins initially at a low speed, and it accelerates gradually thereafter to rotate at a high speed. As a result, as shown by the arrow Q in FIG. 2A, a perimeter fluid is drawn in from between the one side 10a of the top foil 10 and one end of the back foil piece 11a, and flows into the space between the top foil 10 and the rotating shaft 1. Thereby, a fluid lubrication film is formed between top foil 10 and the rotating shaft 1.

The film pressure of this fluid lubrication film acts on the top foil 10, and presses each of the mountain portions 11c of the back foil pieces 11a which is in contact with the top foil 10. As a result, due to the back foil pieces 11a being pressed by the top foil 10, the mountain portions 11c are pushed and widened. Thereby, the back foil pieces 11a move in the circumferential direction above the bearing housing 12.

That is to say, the back foil pieces 11a (back foil 11) resiliently support the top foil 10. For that reason, the back foil pieces 11a (back foil 11), upon receiving a load from the top foil 10, deform in the circumferential direction, and thereby permit flexure of the top foil 10 and support the top foil 10.

However, as shown in FIG. 2C, since the engagement protruding pieces 30, 30 are engaged in the engagement notches 15, 15 of the bearing housing 12, the back foil pieces 11a are prevented (restricted) from rotating in the circumferential direction on the inner circumferential surface of the bearing housing 12. Accordingly, each mountain portion 11c of the back foil piece 11a deforms (moves) in the circumferential direction with the engagement protruding pieces 30 that are engaged in the engagement notches 15 serving as fixed points (fixed ends), but there is no shifting of the fixed points (fixed ends) of the back foil pieces 11a from the formation positions of the engagement notches 15.

Also, when the back foil pieces 11a deform (move) in the circumferential direction, they are affected by friction with the bearing housing 12 and the top foil 10. For this reason, the other side of the back foil pieces 11a (that is to say, the free end side) easily deforms (easily moves), but the fixed point (fixed end) is hindered from deforming. Accordingly, a difference arises in the support rigidity by the back foil piece 11a between the free end side and the fixed end side.

However, in the present embodiment, the back foil 11 is divided into six back foil pieces 11a. For this reason, compared to the case of forming the back foil 11 with a single foil, the distance between the fixed end and the free end is short. Accordingly, the difference in support rigidity between the free end side and the fixed end side is small.

Also, when the rotating shaft 1 is rotating at a high speed, the engagement notches 15, 15 in which the engagement protruding pieces 30, 30 are engaged also restrict movement of the back foil pieces 11a in the axial direction and regulate their sliding. For that reason, hardly any rattling occurs in the back foil pieces 11a (back foil 11). Also, in the case of an unforeseen impact being applied, the back foil pieces 11a do not drop out from the bearing housing 12 due to the engagement of the engagement protruding pieces 30, 30 in the engagement notches 15, 15. Note that it is a simple structure in which the engagement protruding piece 30 is inserted and engaged in the engagement notch 15. However, since the top foil 10 covers the back foil 11 (back foil pieces 11a), the back foil pieces 11a do not drop out from the bearing housing 12 due to an impact or the like.

Also, in the state until the lubricating fluid film is formed, solid friction is produced between the rotating shaft 1 and the top foil 10, and this serves as resistance during starting. However, according to the radial foil bearing 3 in the present embodiment given above, preload is not produced at both end portions of the top foil 10, and the top foil 10 of the side at which the ambient fluid flows in is flexible due to the thin-walled portion 18. For this reason, the space between the top foil 10 and the rotating shaft 1 easily opens, and so when the rotating shaft 1 starts rotating, the lubricating fluid film is formed quickly, so that the rotating shaft 1 rotates in a non-contact state with respect to the top foil 10.

In the radial foil bearing 3, the engagement notches 15 are formed in both side surfaces of the bearing housing 12, and the engagement protruding pieces 30 are provided at both side end portions of one side of each back foil piece 11a, with these engagement protruding pieces 30, 30 being engaged with the engagement notches 15, 15, respectively. For that reason, it is possible to house and fix the back foil pieces 11a (back foil 11) in the bearing housing 12 without performing spot welding on the back foil pieces 11a. Also, sliding of the back foil pieces 11a in the circumferential direction and axial direction of the bearing housing 12 is restricted by the engagement notches 15, 15 that are formed in both side surfaces of the bearing housing 12. For that reason, hardly any rattling occurs in the back foil pieces 11a (back foil 11). Accordingly, it is possible to prevent the occurrence of strain in the top foil 10 due to spot welding of the back foil 11 (back foil pieces 11a) or rattling of the back foil, and so it is possible to sufficiently lessen strain of the top foil 10. Thereby, with regard to the load capability and the dynamic characteristic (rigidity and attenuation) of the bearing, it is possible to obtain a radial foil bearing having as-designed good performance.

Also, with regard to the back foil 11, since it is possible to eliminate conventional spot welding, and moreover the bending that produces strain is limited to a small area, it is possible to lower the difficulty of fabrication, and it is possible to reduce the manufacturing cost. That is to say, since improper assembly due to poor welding and variations in assembly are eliminated, the yield rate during manufacturing improves, and so it is possible to lower the manufacturing cost. Also, special bending of the back foil 11 is not performed, with only simple bending performed. For that reason, it is possible to carry out press molding of the back foil 11 with high precision.

Moreover, since welding of the back foil 11 is not required, the yield rate during manufacture and performance are not impacted by the quality of the welding. As a result, the reproducibility of a non-defective article increases, and so the mass producibility improves.

Moreover, in the case of dividing the back foil 11 into a plurality in the circumferential direction in order to raise the bearing performance of the radial foil bearing, it is possible to manufacture a bearing with fewer steps compared with fixing by welding. Accordingly, it is possible to reduce the manufacturing cost.

In addition, the back foil 11 is constituted by six (a plurality of) back foil pieces 11a that are arranged along the circumferential direction of the top coil 10, and the engagement protruding pieces 30 are respectively formed on these back foil pieces 11a. Thereby, the distance between the fixed end and the free end in the back foil piece 11 is shortened. For that reason, the difference in support rigidity between the free end side and the fixed end side is reduced, and so it is possible to lessen variations of the support rigidity of the back foil 11 as a whole. Accordingly, a uniform support rigidity and slip property are obtained for the entire back foil 11. As a result, it is possible to obtain a radial foil bearing that has a large bearing load capacity, a high bearing rigidity capacity and attenuation capacity.

[Second Embodiment]

Figure 4A:
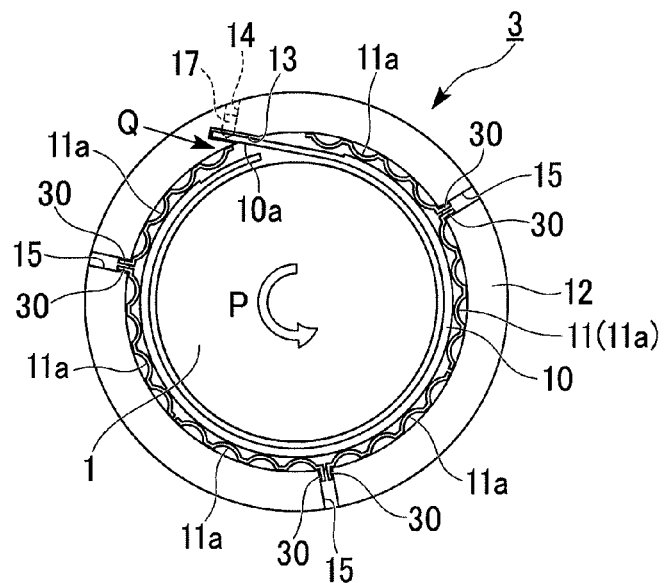
FIG. 4A is a side view of the radial foil bearing that shows an outline constitution of the second embodiment of the radial foil bearing according to the present invention.
Figure 4B:
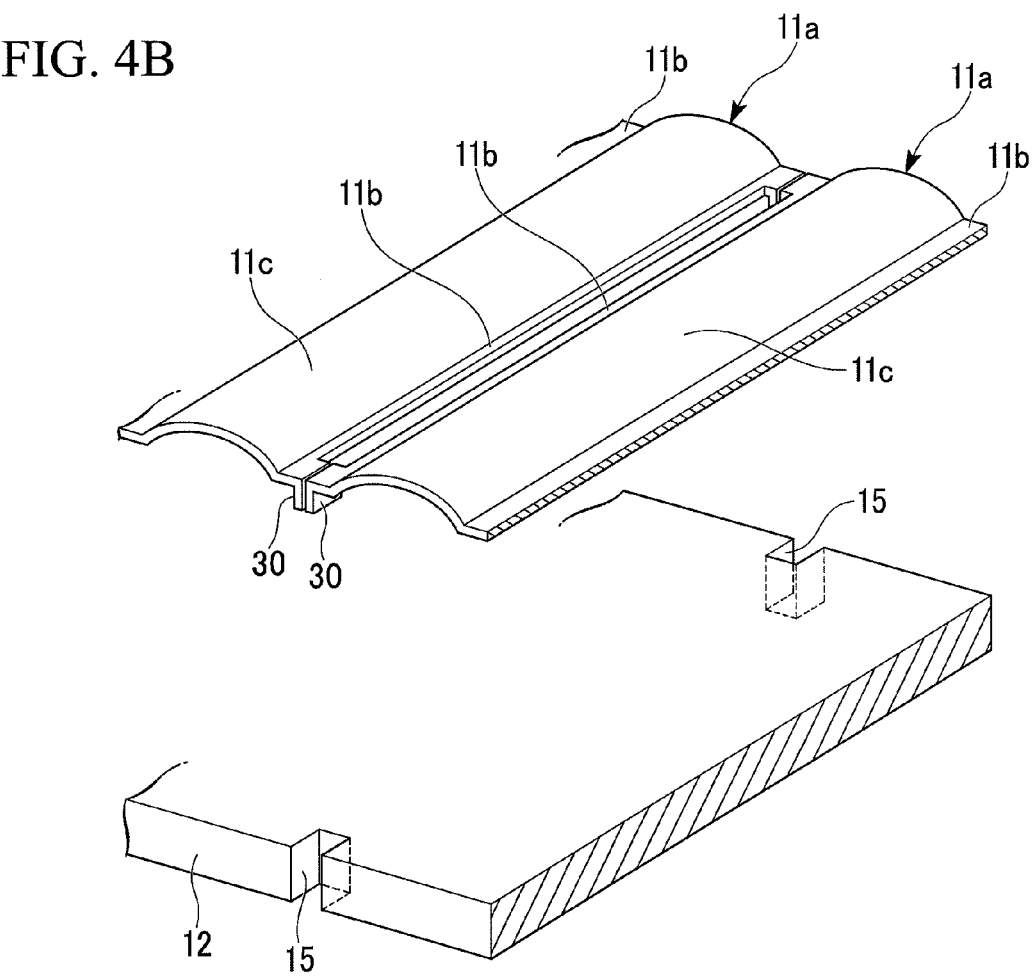
FIG. 4B is a perspective view that shows the essential portions of the radial foil bearing, showing an outline constitution of the second embodiment of the radial foil bearing according to the present invention.

Next, the second embodiment of the radial foil bearing that is applied to the turbomachine shown in FIG. 1 shall be described referring to FIG. 4A and FIG. 4B. The radial foil bearing 3 of the present embodiment differs from the radial foil bearing 3 of the first embodiment shown in FIG. 2A to FIG. 2D, FIG. 3A and FIG. 3B on the point of the placement of the back foil pieces 11a.

That is to say, in the present embodiment, as shown in FIG. 4A, among the six back foil pieces 11a, the mutually adjacent pair of back foil pieces 11a, 11a are arranged so that their respective engagement protruding pieces 30 are in a contiguous state. Also, in accordance with this, three engagement notches 15 each, instead of six, are formed in both side surfaces of the bearing housing 12. With the aforementioned constitution, in the radial foil bearing 3 of the present embodiment, a pair of the engagement protruding pieces 30, 30 that are arranged contiguously, of a pair of back foil pieces 11a, 11a that are adjacent, engage in one engagement notch 15 as shown in FIG. 4B.

Note that the engagement notches 15 shown in FIG. 4B each engage with a pair of the engagement protruding pieces 30, 30. For this reason, compared to the engagement notches 15 shown in FIG. 2B that each engage with one of the engagement protruding pieces 30, 30, the width thereof is approximately double.

In addition to having the same effect as the radial foil bearing 3 of the first embodiment shown in FIG. 2A to FIG. 3B, the radial foil bearing 3 of the aforementioned constitution is capable of reducing the number of engagement notches 15 to be formed in the bearing housing 12. That is to say, since it is possible to reduce the number of locations of the bearing to be machined, it is possible to hold down the machining cost.

[Third Embodiment]

Figure 5A:
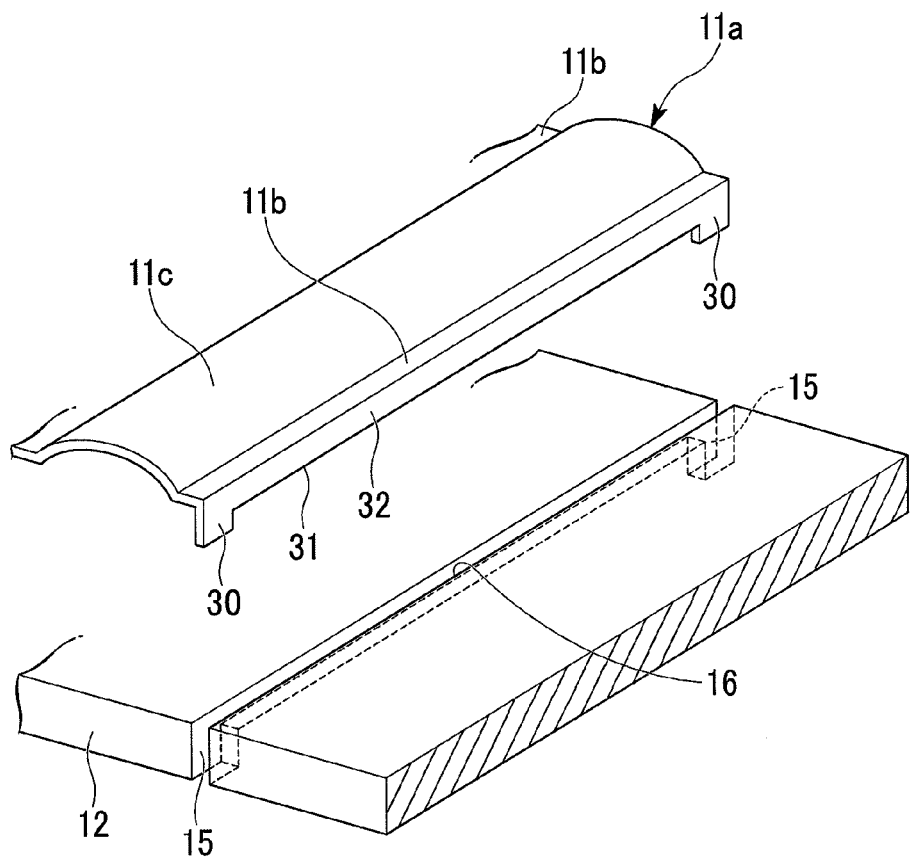
FIG. 5A is a perspective view that shows the essential portions of the radial foil bearing, showing an outline constitution of the third embodiment of the radial foil bearing according to the present invention.
Figure 5B:
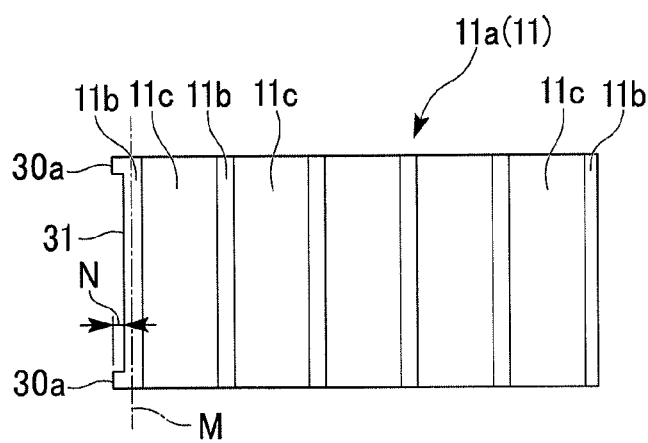
FIG. 5B is a plan view of the flattened back foil piece, showing an outline constitution of the third embodiment of the radial foil bearing according to the present invention.

Next, the third embodiment of the radial foil bearing that is applied to the turbomachine shown in FIG. 1 shall be described referring to FIG. 5A and FIG. 5B. The radial foil bearing 3 of the present embodiment differs from the radial foil bearing 3 of the first embodiment shown in FIG. 2A to FIG. 2D, FIG. 3A, and FIG. 3B on the point of the structure of the engagement portion of the back foil piece 11a with respect to the bearing housing 12.

That is to say, in the present embodiment, an engagement protrusion 32 with a lower height than the engagement protruding piece 30 is provided between the engagement protruding pieces 30, 30, in the back foil piece 11a as shown in FIG. 5A. It is possible to form the engagement protrusion 32 by bending at the position shown by the bending line M, shown in FIG. 5B, which is a plan view of the flattened back foil piece 11a. That is to say, in the present embodiment, compared to the case shown in FIG. 3A, the dimension N of the concave portion 31 in the circumferential direction of the back foil piece 11a is made smaller, and the bending line M is moved away from the both side end portions 30, 30 by that portion. Thereby, when the back foil piece 11a is bent at the bending line M, not only the both side end portions 30a, 30a, but also a portion of the valley portion 11b between them is bent. As a result, the engagement protrusion 32 with a lower height than the engagement protruding piece 30 is provided between the engagement protruding pieces 30, 30, as shown in FIG. 5A.

Also, between the opposing pair of engagement notches 15 in the inner circumferential surface of the bearing housing 12, an engagement groove 16 with a depth that is shallower than the engagement notches 15, 15 is formed to be in communication with the engagement notches 15, 15. Thereby, a step portion (not illustrated) is formed between the engagement notch 15 and the engagement groove 16. The depth of the engagement groove 16 corresponds to the length (height) of the engagement protrusion 32, that is to say, the length that extends downward, and is formed to be the same depth as or slightly deeper than it. Note that the depth of the engagement notch 15 until the step portion is formed to be the same as or slightly deeper than the horizontal width of the engagement protruding piece 30.

In the back foil piece 11a with the aforementioned constitution, the engagement protruding pieces 30, 30 engage with the engagement notches 15, 15 of the bearing housing 12 and lock with the step portions, and the engagement protrusion 32 engages with the engagement groove 16.

Accordingly, the radial foil bearing 3 of the present embodiment, in addition to the same effect as the radial foil bearing 3 of the first embodiment shown in FIG. 2A to FIG. 3B, can more strongly fix the back foil 11 (back foil pieces 11a) to the bearing housing 12 by causing the engagement protrusion 32 to engage with the engagement groove 16.

Note that the present invention is not limited to the embodiments, and various modifications are possible within a scope of the present invention.

For example, in the embodiments, the back foil 11 was constituted by six back foil pieces 11a, but it is not limited thereto. The back foil 11 may also be constituted by a single element consisting of one metallic foil molded in an approximately cylindrical shape. Also, in the case of being constituted with a plurality of back foil pieces 11a, the back foil 11 may also be constituted with two to five, or seven or more back foil pieces 11a.

Also, in the embodiments, the engagement notch 15 was formed in a groove shape that is cut out from the inner circumferential edge to the outer circumferential edge of the bearing housing 12, but is not limited thereto. Provided that it extends from the inner circumferential edge toward the outer circumferential edge of the bearing housing 12, the engagement notch 15 may be formed by notching until just before the outer circumferential edge without reaching it.

Moreover, in the embodiments, the top foil 10 was made to be housed and fixed within the bearing housing 12 by causing the one end side 10a to be engaged in the groove 13 that was formed in the bearing housing 12, but it is not limited thereto. Regarding the fixing of the top foil 10, it is possible to perform an arbitrary fixing including welding.

Figure 6:
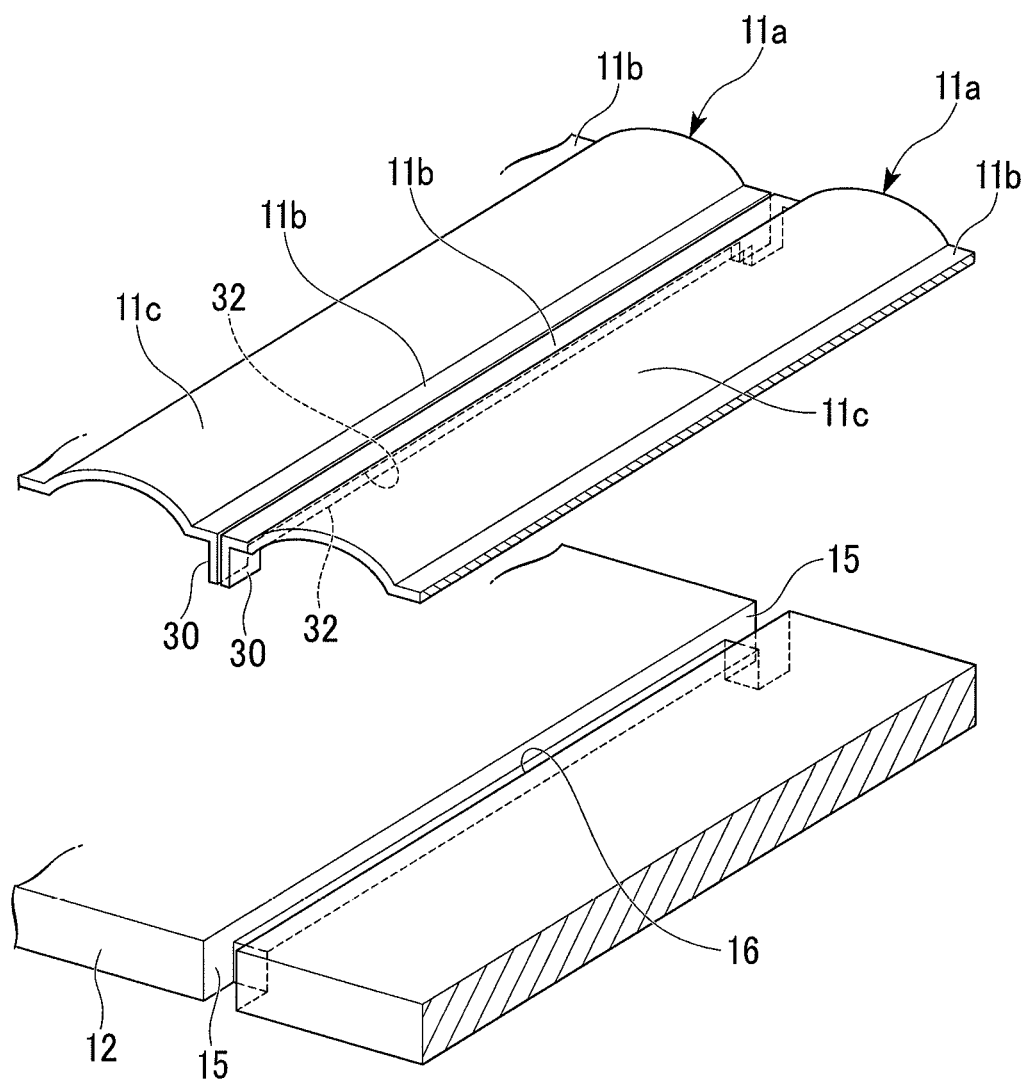
FIG. 6 is a perspective view showing a radial foil bearing that includes a combination of features from the second and third embodiments of FIGS. 4A-5B.

As shown in a modified example in FIG. 6, the back foil piece 11 a provided with the engagement protrusion 32 of the third embodiment may be arranged in the same manner as the placement in the second embodiment. Specifically, the mutually adjacent pair of back foil pieces 11a, 11a are arranged so that their respective engagement protruding pieces 30 (i.e., their respective engagement protrusions 32) are in a contiguous state. Two engagement protrusions 32, 32 that are arranged contiguously engage with one engagement groove 16. For this reason, compared to the engagement groove 16 of the third embodiment shown in FIG. 5A, the width of the engagement groove 16 of the modified example shown in FIG. 6 is approximately double.

INDUSTRIAL APPLICABILITY

According to the radial foil bearing of the present invention, it is possible to obtain a radial foil bearing that has as-designed good performance with regard to the load capability and the dynamic characteristics (rigidity and attenuation) thereof, with an improved yield rate during manufacturing and a lower manufacturing cost.

DESCRIPTION OF THE REFERENCE SYMBOLS

1: rotating shaft, 3: radial foil bearing, 10: top foil, 11: back foil (bump foil), 11a: back foil piece, 11b: valley portion, 11c: mountain portion, 12: bearing housing, 15: engagement notch, 16: engagement groove, 30: engagement protruding piece, 31: concave portion, 32: engagement protrusion

The invention claimed is:

1. A radial foil bearing that, by being fitted on a rotating shaft, supports the rotating shaft, comprising:
a cylindrical top foil that is arranged facing the rotating shaft;
a back foil that is arranged on the outer side of the top foil in the radial direction; and
a cylindrical bearing housing that houses the top foil and the back foil in the state of being inserted therein,
wherein, an engagement notch that extends from the inner circumferential edge to the outer circumferential edge of the bearing housing is formed at both sides of the bearing housing, and an engagement protruding piece that engages with each engagement notch is provided at both side end portions of the back foil on one side in the circumferential direction of the bearing housing;

wherein an engagement groove with a depth that is shallower than the engagement notch is formed in the inner circumferential surface of the bearing housing, between the opposing pair of engagement notches;

an engagement protrusion with a height that is lower than the engagement protruding piece is formed on the back foil between the engagement protruding pieces; and along with the engagement protruding piece engaging in the engagement notch, the engagement protrusion engages in the engagement groove.

2. The radial foil bearing according to claim 1, wherein the back foil is constituted having a plurality of back foil pieces that are arranged along the circumferential direction of the bearing housing; and the engagement protruding piece is formed on each of the back foil pieces.

3. The radial foil bearing according to claim 2, wherein a mutually adjacent pair of back foil pieces among the back foil pieces are arranged in a state of their respective engagement protruding pieces being contiguous, and the contiguous pair of engagement protruding pieces are engaged in one engagement notch.

* * * * *